Patented Sept. 7, 1954

2,688,551

UNITED STATES PATENT OFFICE 2,688,551

METHOD AND COMPOSITION FOR BAKED GOODS

Seymour C. Graham, Chicago, Ill., assignor to Illinois Development Laboratories, Chicago, Ill., a corporation of Illinois No Drawing. Application July 18, 1950,
Serial No. 174,589

6 Claims. (Cl. 99—92)

This invention relates to the manufacture of baked goods capable of retaining its crispness for a reasonable length of time notwithstanding its exposure to high humidity conditions or its use as a container for substances having high moisture content, such, for example, as a holder for ice cream, frozen custard, or the like.

In order to achieve crispness of the type desired in the final product, it is expedient to have a high concentration of shortening or other moisture repelling material uniformly distributed throughout the baked product in order to make the total product hydrophobic in nature so that moisture will be repelled instead of being absorbed.

When large amounts of certain water or moisture resistant materials are incorporated in batter, as distinct from dough, uniform distribution is practically impossible to maintain because of the natural tendency for the moisture resistant material to separate out and concentrate in certain areas. As a result of the concentration of such moisture resistant materials in certain areas, striations invariably form when the batch is baked in metal pans or molds. Under such conditions, an undesirable product is secured, certain parts of which having less moisture resistant materials remain subject to high moisture absorption and rapid deterioration from a crisp product into soft and lifeless baked goods.

It is an object of this invention to provide a method for incorporating high concentrations of moisture resistant materials in batter in a manner to maintain the uniform distribution therein through the processing and baking cycle so that the product remains crisp throughout even under long exposure to high humidity conditions.

Another object is to provide a method of baking batter having a high concentration of moisture resistant material uniformly distributed throughout whereby baking can be carried out in metal pans or molds without the accompanying development of blow holes or striations to produce a baked product capable of retaining its crispness for a reasonable length of time even under exposure to high humidity conditions, and it is a related object to produce a batter prepared with a high concentration of moisture resistant material for use in manufacturing the same.

A further object is to provide a process for preparing baked goods from batter having a high concentration of moisture resistant materials by incorporating such materials in the batter as an aqueous emulsion or dispersion having an emulsifying or dispersing agent effective under normal conditions to maintain the stability and distribution of the emulsion in the batter, but which becomes ineffective under baking conditions and permits the emulsion or dispersion to break and release the moisture resistant material or shortening in its natural state uniformly distributed throughout. It is a related object to make use of an emulsifying or dispersing agent which, when reacting under baking conditions, is converted from a hydrophilic substance to a hydrophobic substance further to improve the moisture resistance of the baked goods.

The objects of this invention are achieved when moisture resistant material is incorporated in high concentration in a batter as an aqueous emulsion or dispersion which is stable under normal conditions but which readily breaks under baking conditions to release the moisture resistant material in its natural state uniformly distributed throughout the baking composition. Under these conditions, redistribution or settling of the moisture resistant released is practically impossible. As a result, non-uniform distribution which has been the cause for the development of blisters and striations when compositions heretofore prepared were baked in metal molds is substantially eliminated and the concentration of moisture resistant material throughout the mass can be kept sufficiently high to impart the desired hydrophobic properties to the baked goods.

The term "high concentration of moisture resistant materials" is meant to include the presence of such material in the batter in amounts ranging from 10 to 50 per cent by weight of the flour. Suitable moisture resistant compounds include animal and vegetable fats and oils such as lard, butter, coconut oil, linseed oil, peanut oil, cottonseed oil, glycols and stearates and the like, and especially the hydrogenated oils of animal or vegetable matter such as hydrogenated linseed oil, coconut oil, peanut oil, and cottonseed oil, and the like, which have the characteristics of being substantially solid under room conditions, such as the product known commercially as "Crisco." Suitable shortening materials may also be selected of the mono-, di-, tri-, and poly-fatty acid esters, such as the stearates, palmitate, oleates of polyhydric alcohols, such as glycol, glycerol, polyethylene glycols, pentaerythritol and the like.

The preferred emulsion or dispersion agents employed in compositions of the type embodied in this invention are characterized by their ability to maintain a stable emulsion with the moisture resistant material in the emulsified or dispersed phase under normal conditions but which, under conditions existing during baking operations, becomes unable to maintain a stable emulsion or dispersion. Under such conditions, the emulsion breaks and releases the water resistant material in situ in its original state uniformly dispersed throughout the baking batch. The break of the emulsified or dispersed phase may result from change in the characteristics of the emulsifying or dispersing agent and it is also conceivable that the break might also be influenced by change in inter-facial physical characteristics resulting from the affect of the rise in temperature or the change in moisture concentration. Whatever the reason, the shortening or water resistant material is released at a time when settling or redistribution into areas of high concentration and areas of low concentration are resisted by the increasing viscosity of the baking batch. Thus the shortening in high concentration is maintained in uniform distribution throughout the baked product and renders same uniformly resistant to moisture absorption.

In the practice of this invention, the shortening may be introduced as an aqueous dispersion or emulsion in concentration ranging from 10 to 50 per cent by weight of the flour, or the flour may be introduced into an emulsion formed of the shortening emulsified in the quantity of aqueous medium required for the batter. By way of illustration, the shortening may be emulsified by a system wherein a desired amount of fatty acid is dissolved in the shortening compound while the soap or salt forming compound such as an alkali or hydroxide is dissolved in the aqueous phase. The two may then be mixed together and upon formation of the corresponding fatty acid salt and the desired amount of agitation, which may be mechanically effected, an emulsion is formed in the usual manner. An amount of emulsifying agent ranging from 1 to 10 per cent by weight of the shortening is usually sufficient, however more may be used, especially when egg white is employed, as will hereinafter be described.

An important concept of this invention resides in the use of an emulsifying or dispersing agent which is converted by reaction under baking conditions from a hydrophilic substance, having emulsifying properties, to a hydrophobic substance which itself imparts greater moisture resistance to the baked product. It has been found that baked products formed of batter employing an emulsifying agent of the type described has much better moisture resistance and its crispness is retained for markedly longer periods of time than are baked goods prepared of batter having emulsifying agent incapable of this type of conversion, such as, for example, when the emulsifying agent is a compound of the type lecithin. The described characteristics are achieved by the use of egg white or whole egg in liquid or powder form. In its natural state, the egg white is capable of excellent emulsification properties but under the high temperature of baking, the egg white is coagulated and converted to a water resistant product. In the course of the change, the egg white loses its ability to maintain the emulsion and permits the dispersed or emulsified phase to break. When egg white is used, amounts ranging from 5 to 25 per cent by weight of the shortening are preferred.

Representative of a larger group of emulsifying agents having features of the type described are the fatty acid soaps embodying a volatilizable component as the salt forming ingredient, such for example, as ammonium oleate, ammonium palmitate, ammonium stearate, ammonium linoleate, and the like. Under the high temperature of baking conditions, ammonia gas is released leaving the corresponding fatty acid which is characterized by marked water resistance and which remains fully compatible with the shortening ingredient. When soaps of the type described are used, concentrations ranging from 1 to 10 percent by weight of shortening is sufficient, although more may be used if desired.

By way of illustration, but not by way of limitation, the following examples are given for the practice of this invention in the manufacture of ice cream cones, wherein crispness is desired over a reasonable length of time notwithstanding its use with such high water content substances.

*Example A.*—A stable emulsion is formed with 5 pounds shortening dispersed in 15 pounds water having 1 pound egg white as the emulsifying agent. Emulsification can be effected by the usual high-speed mixing equipment or other mechanical device as the water is added to the shortening and egg white while heated to liquid stage. To the emulsion 10 pounds of flour and the necessary seasoning is added slowly with mixing to form the batter.

The batter is poured in baking tins and exposed to a temperature of 250 to 450° F. until baking is completed. During the baking cycle, the egg white hardens in the manner of a boiled egg. It loses its ability to function as an emulsifying agent, with the result that the emulsion is allowed to break to release the shortening in situ uniformly distributing throughout the thickening batch. The egg white converted in this manner functions in addition to the shortening to lend water resistance to the baked goods and insure its crispness over longer periods of time.

*Example B.*—One-fourth pound of stearic acid is dissolved in 5 pounds of shortening. An amount of ammonium hydroxide capable of reaction with the stearic acid to form the corresponding ammonium stearate is dissolved in 15 pounds of water. The shortening is emulsified by mechanical means as it and the acid are added to the aqueous medium. The stearic acid reacts with the ammonium hydroxide to form ammonium stearate soap which functions thereafter as an emulsifying agent and imparts stability to the formed emulsion. Flour (10 pounds) and other ingredients, such as seasoning, are added to the emulsion with mixing to form the batter.

The batter is poured into baking pans and heated to 250 to 450° F. until baked. During the baking cycle, the high temperature existing drives off the ammonia phase of the stearate, leaving stearic acid which is not hydrophilic in nature but has hydrophobic characteristics and therefore is incapable of maintaining the emulsion, which, coupled with the change in physical forces existing in the batch, breaks to release the shortening uniformly distributed throughout the batch where it can more effectively function in the manner for which it was intended. The stearic acid which remains operates in addition to the shortening to impart greater moisture resistance to the baked goods.

Instead of employing the system wherein flour is mixed into the dispersion or emulsion of shortening in water, I have found that when the emulsifying agent is also a good surface active agent the emulsifier can be incorporated with the shortening or other water resisting material which can then be mixed in with the dry flour. The entire mass is then whipped up with the desired quantity of water to form the batter.

It has been found that the stability of the emulsion can be further improved by reducing the size and improving the distribution of the dispersed particles by homogenizing the dispersion before flour addition.

The baked goods, when removed from the pan at the completion of the baking cycle, is relatively free of blow holes or shortening blisters heretofore occasioned in the presence of excessive concentrations of shortening when batter is baked in metal pans or molds. The baked goods has a high concentration of shortening throughout which, because of its hydrophobic properties, minimizes the rate of moisture absorption so that the baked goods retains its crispness over long periods of time even when in direct contact with high moisture containing substances. When emulsifying agents are used which are capable of conversion to a hydrophobic substance during the baking cycle, the baked goods are characterized by the absence of such agents as would ordinarily attract water and, instead, has present therein a converted compound which tends further to improve the moisture resistance of the baked goods.

It will be understood that numerous changes may be made in the details of composition, their manner of incorporation and their processing cycle without departing from the spirit of the invention especially as defined in the following claims.

What is claimed is:

1. The method of preparing baked goods having high moisture resistance comprising the steps of mixing batter to include shortening present in an amount ranging from 10–50 per cent by weight of flour in the batter as an aqueous emulsion having a hydrophilic, thermally unstable emulsifying agent selected from the group consisting of egg white and an ammonium salt of a fatty acid effective under normal conditions to maintain the stabilization and distribution of the emulsion in the batter but which becomes ineffective under baking conditions to permit the emulsion to break and release the shortening well distributed in the baking batter where it may function in the manner for which it was intended, casting the batter into metallic baking molds, baking the batter at temperatures ranging from 200–500° F. and then removing the baked product from the molds.

2. The method of preparing baked goods as claimed in claim 1 wherein the emulsifying agent comprises egg white present in amounts ranging from 3–25 per cent by weight of the shortening.

3. The method of preparing baked goods as claimed in claim 1 in which the emulsifying agent comprises an ammonium soap of fatty acid present in amounts ranging from about 1–10 per cent by weight of the shortening.

4. A batter having high shortening content for use in the manufacture of baked goods having high moisture resistance comprising flour, shortening present in amounts ranging from 10–50 per cent by weight of the flour and incorporated in the batter as an aqueous emulsion having a hydrophilic, thermally unstable emulsifying agent selected from the group consisting of egg white and an ammonium salt of a fatty acid present in amounts ranging from 1–25 per cent by weight of the shortening and under baking conditions is converted from a hydrophilic substance to a hydrophobic substance.

5. A composition of material as claimed in claim 4 wherein the emulsifying agent comprises egg whites which are present in amounts ranging from 5–25 per cent of the shortening.

6. A composition of material as claimed in claim 4 in which the emulsifying agent comprises an ammonium salt of a fatty acid present in amounts ranging from 1–10 per cent by weight of the shortening.

References Cited in the file of this patent

UNITED STATES PATENTS

| Number | Name | Date |
| --- | --- | --- |
| 2,123,880 | Coith et al. | July 19, 1938 |
| 2,132,395 | Coith et al. | Oct. 11, 1938 |
| 2,183,516 | Mink | Dec. 12, 1939 |
| 2,255,506 | Frediani | Sept. 9, 1941 |